United States Patent
Hofman

(10) Patent No.: US 10,437,690 B2
(45) Date of Patent: *Oct. 8, 2019

(54) FAULT TOLERANT COMMUNICATION SYSTEM

(71) Applicant: Sital Technology Ltd., Kfar-Saba (IL)

(72) Inventor: Ofer Hofman, Timrat (IL)

(73) Assignee: SITAL TECHNOLOGY LTD., Kfar-Saba (IL)

( * ) Notice: Subject to any disclaimer, the term of this patent is extended or adjusted under 35 U.S.C. 154(b) by 53 days.

This patent is subject to a terminal disclaimer.

(21) Appl. No.: 15/535,726

(22) PCT Filed: Dec. 20, 2015

(86) PCT No.: PCT/IL2015/051232
§ 371 (c)(1),
(2) Date: Jun. 14, 2017

(87) PCT Pub. No.: WO2016/113729
PCT Pub. Date: Jul. 21, 2016

(65) Prior Publication Data
US 2017/0371754 A1     Dec. 28, 2017

Related U.S. Application Data

(60) Provisional application No. 62/102,800, filed on Jan. 13, 2015.

(51) Int. Cl.
| | | |
|---|---|---|
| G06F 11/00 | (2006.01) | |
| G06F 11/20 | (2006.01) | |
| H04L 12/413 | (2006.01) | |
| G06F 11/16 | (2006.01) | |
| G06F 13/42 | (2006.01) | |
| H04L 12/40 | (2006.01) | |
| G06F 13/40 | (2006.01) | |

(52) U.S. Cl.
CPC ...... *G06F 11/2007* (2013.01); *G06F 11/1616* (2013.01); *G06F 13/4072* (2013.01); *G06F 13/4282* (2013.01); *H04L 12/40182* (2013.01); *H04L 12/413* (2013.01); *G06F 2201/805* (2013.01)

(58) Field of Classification Search
CPC ............. G06F 11/2007; G06F 11/1616; G06F 11/1625; G06F 11/2002; G06F 13/4072; G06F 13/4282; H04L 12/40182; H04L 12/413; H04L 12/40013; H04L 12/4135
See application file for complete search history.

(56) References Cited

U.S. PATENT DOCUMENTS

| | | | | |
|---|---|---|---|---|
| 9,407,319 B2 * | 8/2016 | Hofman | .................... | H04B 3/02 |
| 9,502,889 B2 * | 11/2016 | Yang | ....................... | H02H 9/02 |
| 2004/0158781 A1 | 8/2004 | Pihet | | |
| 2006/0109601 A1 | 5/2006 | Bolz | | |

(Continued)

OTHER PUBLICATIONS

International Search Report in PCT/IL2015/51232 dated Apr. 21, 2016.

*Primary Examiner* — Marc Duncan
(74) *Attorney, Agent, or Firm* — Manelli Selter PLLC; Edward Stemberger

(57) ABSTRACT

Described is a differential data bus system which maintains error free communication despite faults in one of the data bus lines.

8 Claims, 9 Drawing Sheets

(56) References Cited

U.S. PATENT DOCUMENTS

2008/0116992 A1* 5/2008 Kishigami ............... H04L 1/24
                                                            333/101
2014/0281079 A1   9/2014 Biskup
2017/0168969 A1*  6/2017 Hsueh ................. H04L 25/0272

* cited by examiner

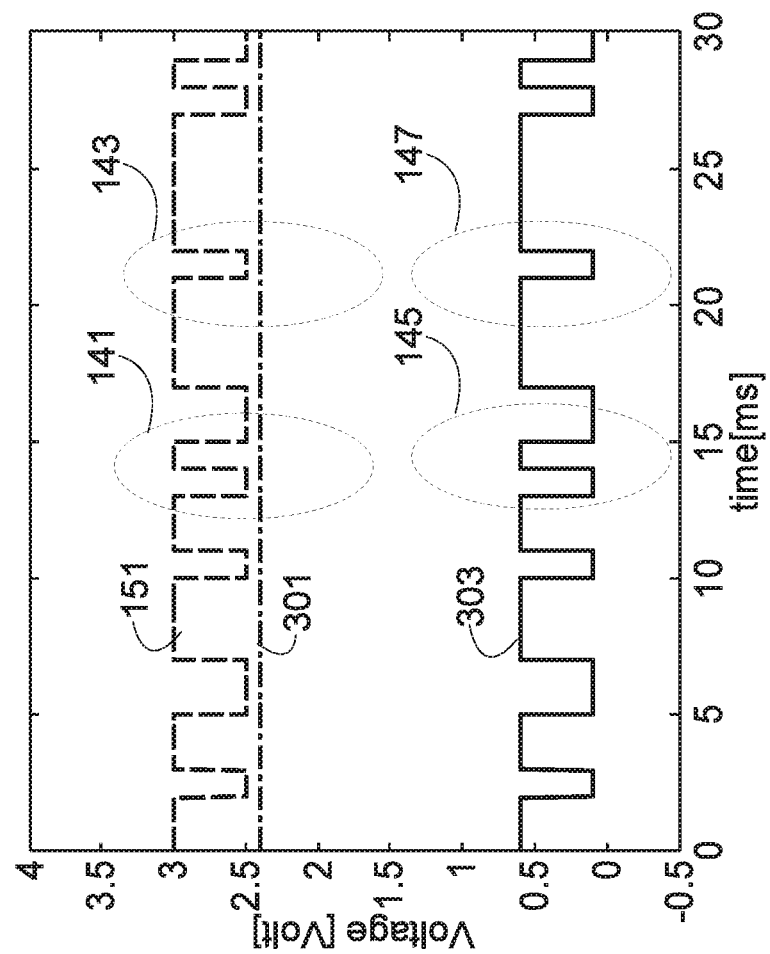

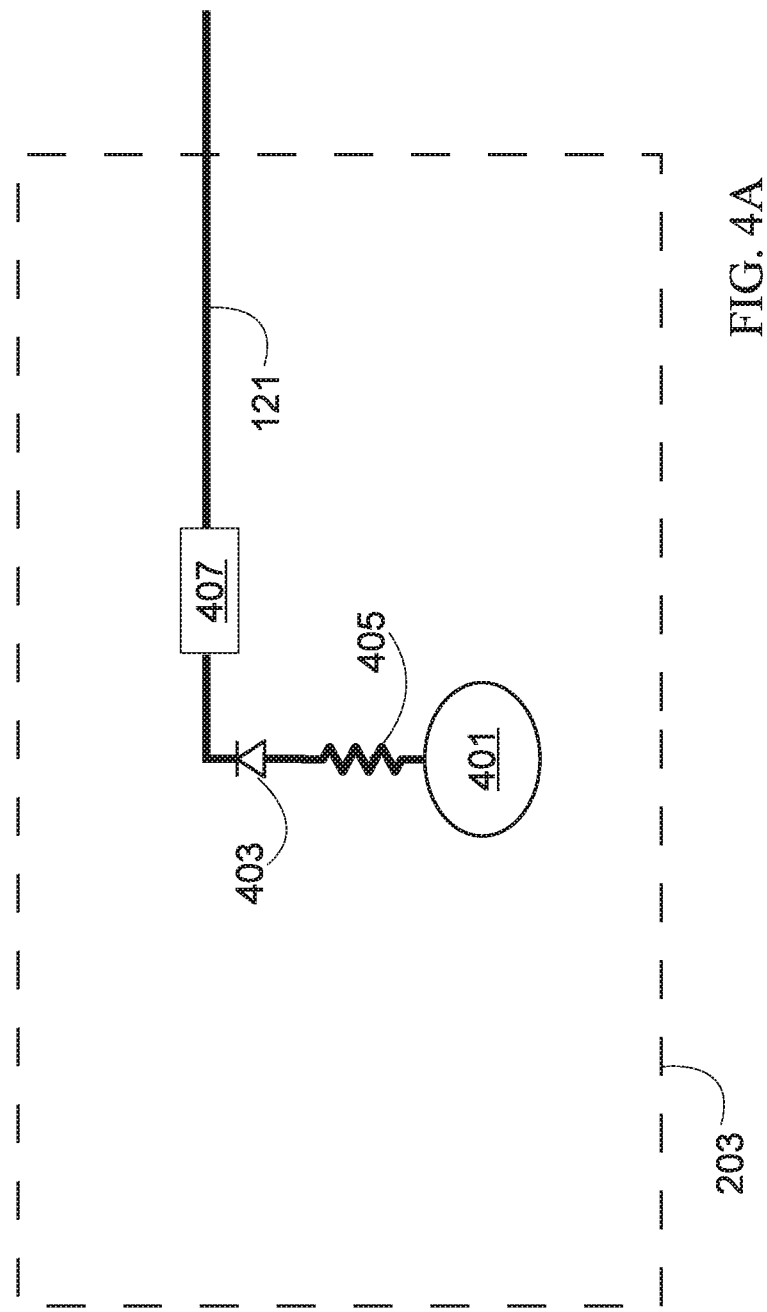

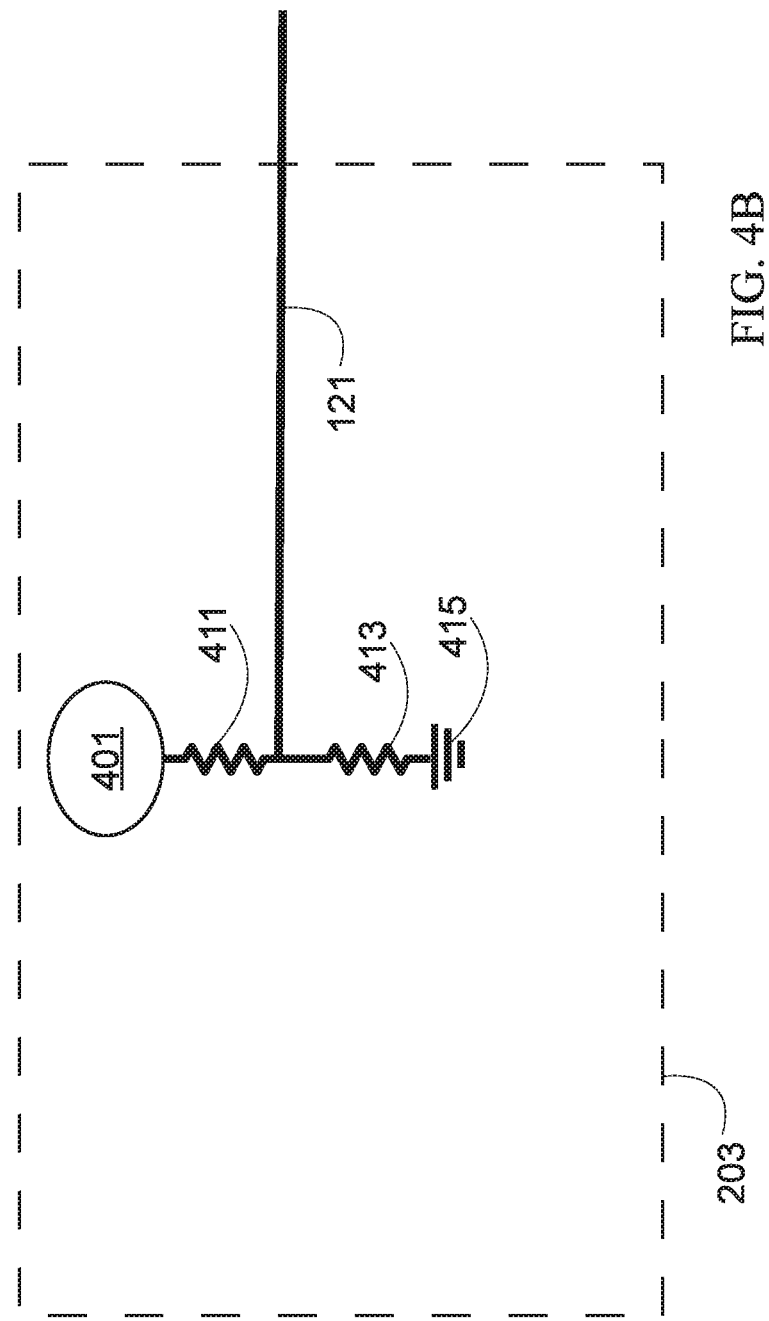

FAULT TOLERANT COMMUNICATION SYSTEM

TECHNOLOGY FIELD

The present device and method relate to the field of fault tolerant communication systems and describes a differential data bus system which can maintain error free communication despite faults in one of the data bus lines.

BACKGROUND

There are several architectures for transmitting information from one electronic device to another. A commonly used architecture is shown in FIG. 1A. In this architecture the devices share a common communication structure, often called a data bus or communication bus. In this architecture, each device connected to the data bus can transmit information on the data bus, or receive any information transmitted on the data bus. In addition the information transmitted on the data bus can pass undistorted through each of the devices. Examples of such buses are Mil-Std-1553, CAN, FlexRay and others.

A large number of devices can be connected to data buses as described above. A potential problem in these data buses is that a fault in the data bus would prevent the passage of information from devices before and after the fault. U.S. Pat. No. 7,812,617 to the same assignee, describes a method to identify the fault in a communication bus. The method is based on identifying reflections in the communication bus. The reflections are caused by the fault in one of the communication bus links and are referred to as 'signal tail'. U.S. Pat. No. 7,812,617 suggest a method of identifying the location of the fault by measuring the timing of such multiple tails, and using triangulation to identify the location of a fault.

Examples of a fault are a mechanical cut or other form of disconnect in one of the data bus wires. During the occurrence of such a fault the transmitted data on the data bus would be received with a large number of errors which can reduce the utilization of the data bus to less than 10% of its original capacity. It is desirable to provide a data bus architecture which can reduce the number of transmission errors in the event of a fault in the differential data bus.

Glossary

Data bus—as used in the current disclosure means one or more wires connecting two or more electronic devices and used to transmit electronic data information from one device to another.

Binary data bus—as used in the current disclosure means a data bus with a set of two voltage levels.

Communication bus—as used in the current disclosure means one or more wires connecting two or more electronic devices and used to transmit electronic data information from one device to another.

Differential data bus—as used in the current disclosure means a data bus comprising of two wires where the electronic data information is the voltage difference between the two wires.

Data bus line—as used in the current disclosure means a wire used in a data bus.

Voltage level—as used in the current disclosure means a predefined voltage of the data bus line.

Differential transmitter—as used in the current disclosure means an electronic device connected to the data bus line and used to effect a voltage level on the data bus line.

Differential receiver—as used in the current disclosure means an electronic device connected to the data bus line and used to measure the voltage level on the data bus line.

Binary data bus—as used in the current disclosure means a data bus with a set of two voltage levels.

Low voltage level—as used in the current disclosure means the lower voltage level of a set of two voltages used in a binary data bus.

High voltage level—as used in the current disclosure means the higher voltage level of a set of two voltages used in a binary data bus.

Reference voltage—as used in the current disclosure means a voltage corresponding to the common voltage among the set of voltage levels of a differential data bus.

Line voltage signal—as used in the current disclosure means the time varying voltage level on the data bus line.

Data signal—as used in the current disclosure means the difference between the voltage levels on the two data bus lines of a differential data bus Fault condition—as used in the current disclosure means a fault, electrical disconnect, open circuit, failed connector or other mechanism which prevents current from flowing across the data bus line.

Voltage control unit—as used in the current disclosure means a unit connected to the data bus and provides a reference voltage to the data bus.

SUMMARY

The ability of a communication system using a differential signal between two bus wires is enhanced by means of limiting the maximal or minimal voltage on each of the wires. Various approaches to limit the voltage are described.

DESCRIPTION OF FIGURES

FIG. 3 is an example of the received signals on the fault tolerant data bus connecting electronic devices;

FIG. 4A is an example of termination unit for supporting a fault tolerant data bus;

FIG. 4B is another example of termination unit for supporting a fault tolerant data bus;

DESCRIPTION

Figure 1A:
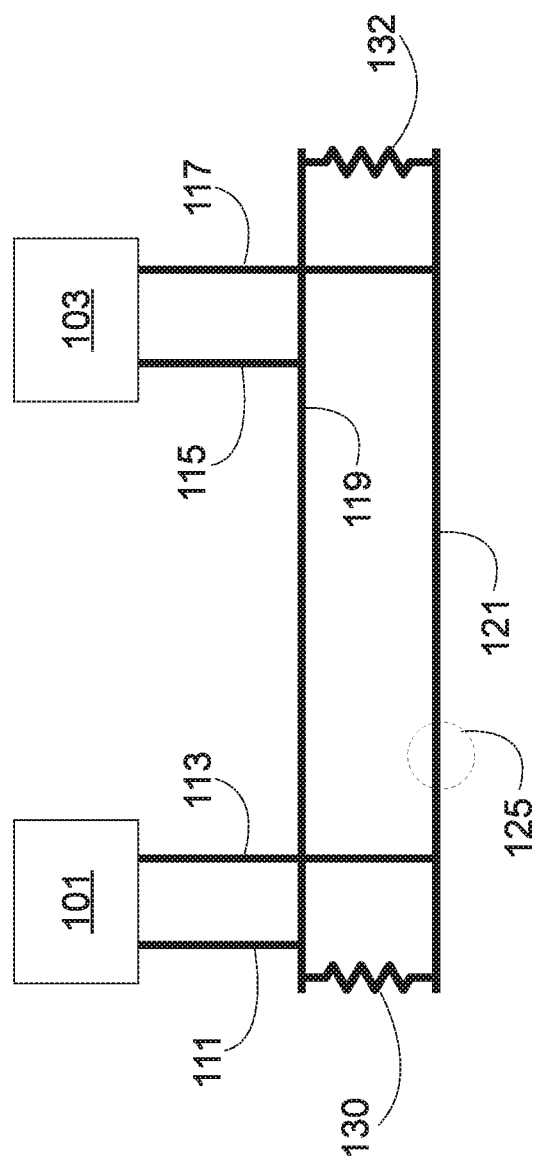
FIG. 1A is an example of a data bus connecting electronic devices.

FIG. 1A is an example of a data bus (119, 121) providing a means to connect electronic devices (101, 103) to each other. FIG. 1A is an example of a data bus, where device 101 is connected to the data bus (119, 121) via lines 111, 113 and device 103 is connected to the data bus (119, 121) via lines 115, and 117. The devices (101, 103) transmit data by applying a voltage on the data bus (119,121). In one example, in a differential data bus, the initial line voltage level of data bus line 119 is equal to the initial voltage level of data bus line 121. When the devices (101, 103) transmit data they generate a time varying line voltage signal comprised of a set of voltage levels. A bit is the minimal data information unit. It can have two values a '1' or a '0'. Each bit is defined by a set of two voltages levels which are applied by the device (101, 103) on the data bus (119, 121) for the duration of time corresponding to the bit duration. Termination resistors (130, 132) provide a matched impedance at the termination point of the bus and prevent signal reflections from the termination point of the bus.

Figure 1B:
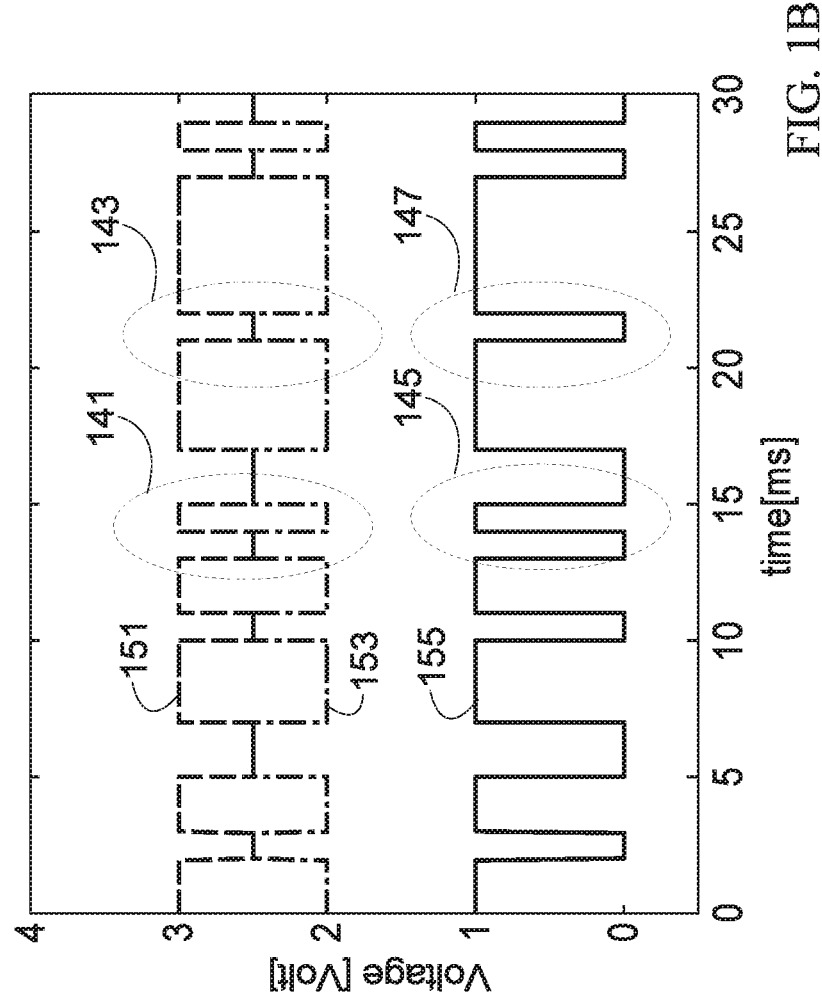
FIG. 1B is an example of the received signals on the data bus.

FIG. 1B is an example of the line voltage signals (151, 153) on the data bus (119, 121). The resulting data signal (155) is the voltage difference between the line voltage signals (151, 153). Line 151 is the line voltage signal on one data bus line (119), and line 153 is the line voltage signal on the second data bus line (121). Line 151 comprises two voltage levels. An example of a voltage level is a high voltage level of 3V, and a low voltage level of 2.5V. Examples of other voltage level are described in relevant communication standards such as CAN Bus Spec 2.0, ISO 11898-2. In CAN Bus Spec, the CAN high voltage on a bus line wire (119) is 3.5V and the CAN low voltage on a bus line wire (121) is 1.5V. The signals are named dominant and recessive. Dominant signal, also named '0', is when the voltage difference between the bus line wires (119, 121) is higher than 2V. Recessive signal, also named '1', is when the voltage difference is 0V (zero) and both wires are floating on a common voltage of 2.5V. Line 153 comprises of two voltage levels. In one example the high voltage level of line 153 is equal to the low voltage level of line 151. In another example the high voltage level of data bus line 153 is lower than the low voltage level of data bus line 151. In one example the high voltage level of data bus line 153 is lower by more than 0.5V over the low voltage level of data bus line 151.

The data signal described in FIG. 1B is comprised of multiple bits. In one example a '1' bit is shown in ellipse 145. In one example a '1' data signal is obtained when the voltage level in line voltage 151 is high and when the voltage level in line voltage 153 is low as shown in ellipse 141. In another example a '0' data signal is shown in ellipse 147. In one example a '0' data signal is obtained when the voltage level in line voltage 151 is low and when the voltage level in line voltage 153 is high as shown in ellipse 143.

Figure 1C:
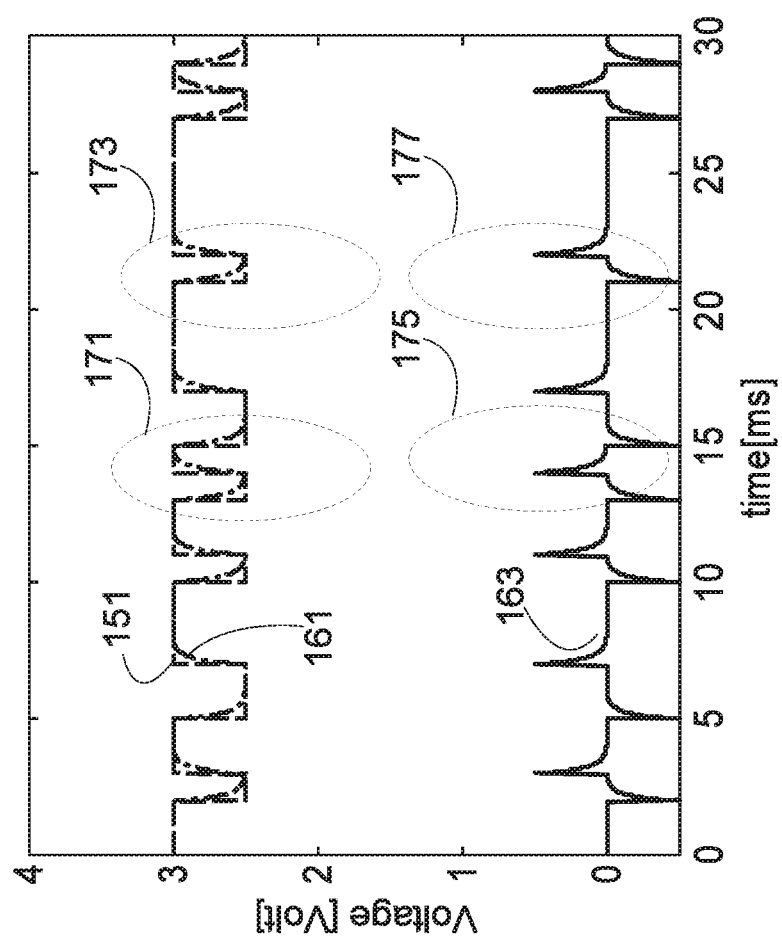
FIG. 1C is an example of the received signals on the data bus during the occurrence of a fault in the data bus.

FIG. 1C is an example of the line voltage signal and data signal on the data bus (119, 121) during a fault condition. An example of a fault condition is "a disconnect" or absence of contact in one of the data bus wires 121). An example of a fault condition is shown in circle 125 in FIG. 1A. In this example, the line voltage signal on data bus line 119 remains unchanged from its normal operation value and is marked as line 151. The line voltage on data bus line 121 changes from line 153 in FIG. 1B to line 161 in FIG. 1C. The line voltage signal (161) of data bus line 121 tracks the line voltage signal (151) of data bus line 119. The difference in line voltage signals is due to the resistance and capacitance of the differential data bus line. 163 is the resulting data signal, which is the difference between the line voltage signals (161, 151). The resulting data signal (163) is an ambiguous data signal which does not correspond to a '1' (177) or '0' (175) signal and would cause errors in the receiver of the electronic device (101, 103).

Figure 2:
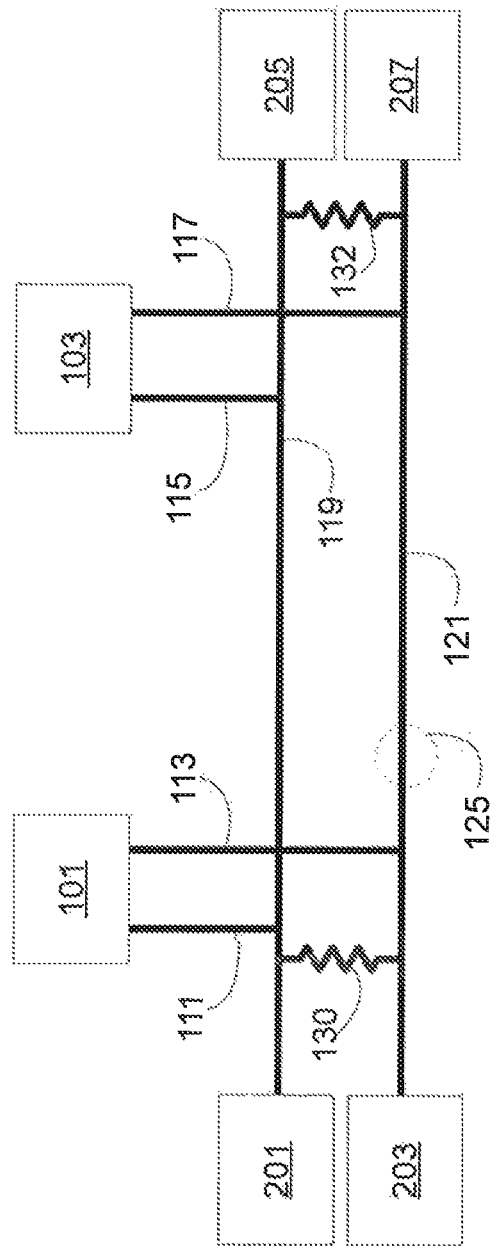
FIG. 2 is an example of fault tolerant data bus.

FIG. 2 is an example of a fault tolerant data bus. The tolerance to faults is achieved by adding voltage control units 201, 203, 205, 207 to the data bus (119, 121). Voltage control units 201, 203, 205 and 207 provide a reference voltage for the data bus (119, 121). In one example the reference voltage is the common voltage level of the set of voltages of the data bus lines (119, 121). In a numeric example, if the voltage levels on data bus line 119 are 2.5V and 3V respectively and the voltage levels on data bus line 121 are 2V and 2.5V respectively than the common voltage is 2.5V. The units (201, 203, 205, 207) prevent the signal 161 in FIG. 1C from occurring. In one example, when there is a fault (125) in the data bus, the line voltage signal in faulty data bus line (121) will follow the line voltage signal of the data bus line without the fault (119), as depicted in FIG. 1C. When the line voltage signal of line 121 follows the line voltage signal of 119, the data signal which is the difference between line voltage signal in data bus lines 121 and 119 is reduced and the data bus cannot be used to transmit information. In one example, unit 207 will prevent the line voltage signal (161 in FIG. 1C) of data bus line (121) from going above the reference voltage.

FIG. 3 is an example of the line voltage signals (151, 301) on the data bus lines (119, 121 in FIG. 2). Line voltage signal 151 is the line voltage signal of data bus line 119 which does not have a fault. Line 301 is the line voltage signal on data bus line 121 after the fault. The maximal voltage level on the line is controlled by unit 207 and defined by the reference voltage. The minimal voltage level on the data bus line (121) is the original low voltage level of line 121. In one example the respective voltages are summarized; high voltage level on line data bus 119 is 3V; low voltage level on data bus line 119 is 2.5V; high voltage level before the fault condition on data bus line 121 is 2.5V; low voltage level before the fault condition on data bus line 121 is 2V; reference voltage is 2.5V; high voltage level after the fault condition on data bus line 121 is limited to less than the reference voltage by unit 207.

Because of this FIG. 2 is an example of a fault tolerant communication system comprising a differential data bus comprised of two data bus lines; a reference voltage; at least one transmitter configured to generate a line voltage signal on differential data bus; at least one receiver configured to receive a line voltage signal from the differential data bus; and at least one voltage control unit connected to differential data bus; wherein the voltage control unit maintains the voltage in one data bus line above the reference voltage and the voltage in the second data bus line below the reference voltage.

FIG. 4A is an example of voltage control unit (203, 205, 207, 209 in FIG. 2) supporting a fault tolerant data bus. The voltage control unit (203, 205, 207, 209 in FIG. 2) is composed of a voltage source (401) or voltage regulator, and a diode (403). In one example, the voltage control unit (207 in FIG. 2) is connected to a data bus line (121 in FIG. 2). The voltage control unit (207 in FIG. 2) will prevent the voltage in data bus line 121 exceed V0 (zero). The voltage source (401) provides a voltage which is given by Vs=V0+VD where Vs is the voltage of the voltage source (401), and VD is the forward voltage of the diode (403). In another example, if the voltage is to exceed V0, the diode would be assembled in reverse with the forward terminal facing the voltage source. In this example the voltage Vs of the voltage source (401) is given by Vs=V0−VD.

In another example, resistor (405), can be electronically connected in series to the diode (403) to reduce voltage spikes as a result of the voltage control unit (201, 203, 205, 207 in FIG. 2) function. To sum, in one example, the voltage control unit comprises a diode (403) connected to a data bus line (121) and a voltage source (401) connected to diode (403). In another example, the voltage control unit (203,

205, 207, 209 in FIG. 2) comprises a diode connected to a data bus line and a resistor connected to the diode and a voltage source connected to resistor. In another example, the voltage control unit comprises a resistor connected to a data bus line and a resistor connected to the diode and a voltage source connected to resistor.

In another example, connect unit 407 is an electronic switch which is activated when a fault is detected. In this example, under normal operating conditions the voltage control unit (201, 203, 205, 207 in FIG. 2) is disconnected from the data bus lines (119, 121 in FIG. 2). When a fault condition is detected by devices (101, 103) connected to the data bus, the device (101, 103) which detects the fault operates the connect unit 407, to connect the voltage control unit (201, 203, 205, 207 in FIG. 2) to the data bus line (119, 121 in FIG. 2). When voltage control unit (201, 203, 205, 207 in FIG. 2) is connected to the data bus line (119, 121 in FIG. 2) the data bus (119, 121) continues to transmit information despite the fault. In this example, the voltage control unit includes a connect unit configured to connect the voltage control unit to the data bus line (119, 121) in the event of a fault condition. The connect unit 407 only connects the voltage control unit of the line with a fault. In one example, when the fault is in line 121, the connect unit would connect voltage control units 203, and 207.

FIG. 4B is another example of voltage control unit (201, 203, 205, 207 in FIG. 2) supporting a fault tolerant data bus such as RS485. The voltage control unit (201, 203, 205, 207 in FIG. 2) is composed of a voltage source (401) or voltage regulator. The voltage source (401) is connected to the ground terminal (415) through resistors (411, 413). The bus line (121) is connected to the ground terminal (415) via resistor 413 and to the voltage source (401) via resistor 411. The voltage at the bus line (121) is given by the V*R2/(R1+R2) where V is the voltage of the voltage source, R1, is the resistance of resistor 411, and R2 is the resistance of resistor 413. The values of resistors 411, and 413 are chosen to be similar to the terminating resistors 130, and 132 in FIG. 2. In one example resistor 411 is 120 Ohm and resistor 413 is 120 Ohm. In an additional example, resistor 411 is between 100 Ohm and 150 Ohm and resistor 413 is between 100 Ohm and 150 Ohm. In the case of a fault condition such as a cut (125 in FIG. 2) in line 121 in FIG. 2, the voltage in line 121 is defined by the resistors (411, 413) and voltage source (401) in the voltage control unit. To sum, a voltage control unit comprises a voltage source (401), and at least two resistors were the voltage source is connected to a resistor, a second resistor connected to first resistor and second resistor connected to a ground terminal, wherein the data bus line is connected to first and second resistor.

To understand the operation of the circuit described in FIG. 4B is we review the voltages at different elements of the circuit. The voltage at 115 is 0 v (zero), as forced by 101. The voltage at 117 is defined by the network of resistors 411, 413 of FIG. 4B, and resistor 132 of FIG. 2. For example, If all three resistors are of the same value, then the voltage at 121 (117) is ⅓ the voltage of 401. In an example when the voltage at 401 is 3V, the voltage at 121 is 1V. The voltage difference at the inputs of 103 are thus 1V. In an example where at 103 the differential threshold is 200 mV, then 103 would detect the transmitted data of 101.

Similarly, when 101 transmits the opposite value, for example 3V at 111, and 0 v at 113, the voltage at 117 is 2V, providing a 1V difference of opposite polarity.

Symmetrically, when 103 transmits to 101 and 125 is cut, 101 would receive the information due to the voltage control circuits 201 and 203.

Figure 5A:
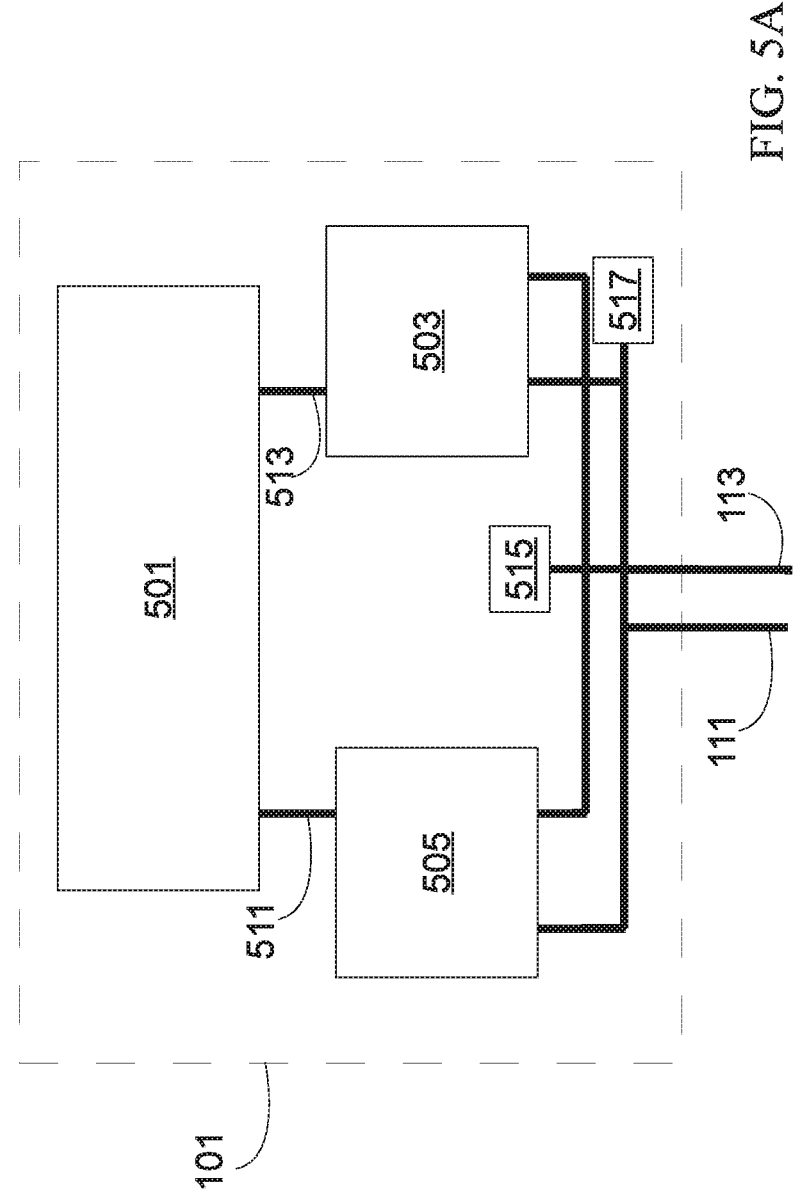
FIG. 5A is an example of an electronic device connected to a data bus.

FIG. 5A is an example of an electronic device such as devices 101, and 103 in FIG. 1, which are connected to a data bus (119, 121 in FIG. 1). In one example the electronic device (101) includes an electronic functional unit (501), a differential receiver (503), a differential transmitter (505), electric connection (511, 513) between differential transmitter (505), differential receiver (503) and electronic functional unit (501) and voltage control units (515, 517). The voltage control units (515, 517) perform the same function as voltage control unit (201, 203, 205, 207 in FIG. 2). In one example, voltage control unit 515 is configured to prevent the voltage of line 111 to go below a defined voltage. Voltage control unit 517 is configured to prevent the voltage of line 113 exceeding a defined voltage.

Figure 5B:
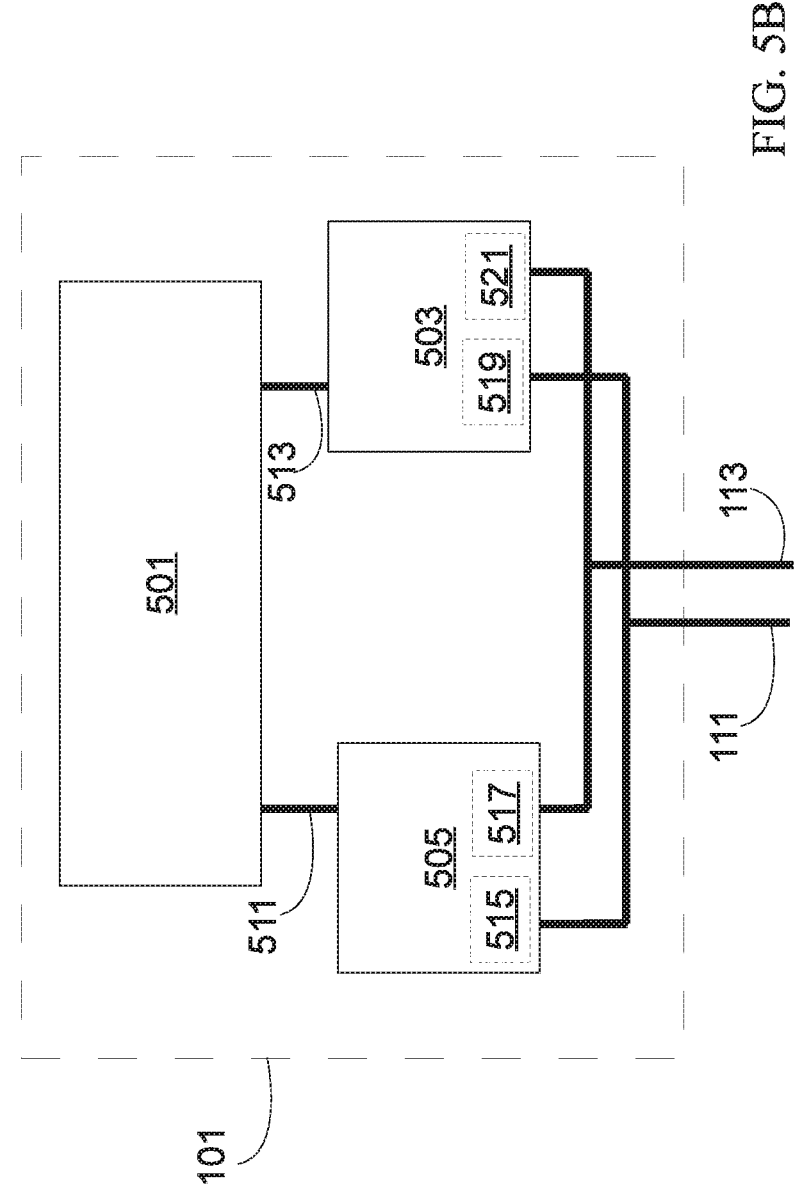
FIG. 5B is an example of an electronic device connected to a data bus.

FIG. 5B is an example of an electronic device such as devices 101, and 103 in FIG. 1, which are connected to a data bus (119, 121 in FIG. 1). In one example the electronic device (101) includes an electronic functional unit (501), a differential receiver (503), a differential transmitter (505), electric connection (511, 513) between differential transmitter (505), differential receiver (503) and electronic functional unit (501). In this example the differential receiver (503) or differential transmitter or both can include voltage control units (515, 517, 519, 521). In a further example, differential transmitter (505), differential receiver (503) can be realized as one integrated circuit, or one electronic module with embedded voltage control unit (515, 517). In one example, voltage control unit 515 is configured to prevent the voltage of line 111 to go below a defined voltage. Voltage control unit 517 is configured to prevent the voltage of line 113 exceeding a defined voltage. To sum, voltage control unit (515, 517, 519, 521) can be embedded in the differential transmitter (505) or differential receiver (503).

In another example, when the high voltage difference is more than 1V, and the actual high voltage difference of the transmitter is 1.9V. In the case of a fault in a bus line (e.g. 121) and operation of a voltage control unit (203, 207 in FIG. 2) the high voltage difference would be reduced to 1V. The reduced high voltage difference might prevent detection of the transmitted signal. To overcome this problem it is suggested that the transmitters in communication systems using the proposed invention transmit voltage differences that are the maximum allowed for the protocol standard, For example in a CAN Bus system the transmitted voltage difference is 2.5V. In another example when voltage control unit (515, 517 in FIG. 5B) is embedded in the transmitter (505 in FIG. 5B), the transmitter would increase its transmission voltage to the maximal allowed voltage when a fault condition occurs.

What is claimed is:

1. A fault tolerant communication system comprising:
   a differential data bus comprised of first and second data bus lines;
   a reference voltage;
   at least one differential transmitter configured to generate a line voltage signal on the differential data bus;
   at least one differential receiver configured to receive a line voltage signal from the differential data bus;
   a first and a second voltage control unit connected to the differential data bus; and
   wherein the first voltage control unit is constructed and arranged to maintain the voltage in the first data bus line above the reference voltage and the second voltage control unit is constructed and arranged to maintain the voltage in the second data bus line below the reference voltage.

2. The fault tolerant communication system according to claim 1 where the reference voltage is a common voltage level of a set of voltages of the two data bus lines.

3. The fault tolerant communication system according to claim 1 wherein each of the voltage control units comprises a diode connected to a data bus line and a voltage source connected to the diode.

4. The fault tolerant communication system according to claim 1 wherein each of the voltage control units comprises a resistor connected to a data bus line, a diode connected to the resistor and a voltage source connected to diode.

5. The fault tolerant communication system according to claim 1 wherein each of the voltage control units comprises a diode connected to a data bus line, a resistor connected to the diode and a voltage source connected to the resistor.

6. The fault tolerant communication system according to claim 1 wherein each of the voltage control units includes a connect unit configured to connect the voltage control unit to the data bus line in an event of a fault condition.

7. The fault tolerant communication system according to claim 1 wherein each of the voltage control units comprises a voltage source, and first and second resistors, wherein the voltage source is connected to the first resistor, the second resistor is connected to the first resistor and second resistor is connected to a ground terminal, and wherein the data bus line is connected to the first and the second resistors.

8. The fault tolerant communication system according to claim 1 wherein each of the voltage control units is embedded in the differential receiver or differential transmitter.

\* \* \* \* \*